United States Patent [19]
Robinson et al.

[11] Patent Number: 5,729,305
[45] Date of Patent: Mar. 17, 1998

[54] OPTICAL DEVICE INCLUDING A SPATIAL OPTICAL MODULATOR AND AN OPTICAL ELEMENT

[75] Inventors: Michael Geraint Robinson; Craig Tombling, both of Oxfordshire, United Kingdom

[73] Assignee: Sharp Kabushiki Kaisha, Osaka, Japan

[21] Appl. No.: 492,893

[22] Filed: Jun. 20, 1995

[30] Foreign Application Priority Data

Jun. 20, 1994 [GB] United Kingdom .................. 9412347

[51] Int. Cl.⁶ .......................... G02F 1/13; G02F 1/135
[52] U.S. Cl. .................................. 349/2; 349/25
[58] Field of Search ........................ 349/2, 24, 25, 349/27

[56] References Cited

U.S. PATENT DOCUMENTS

| | | | |
|---|---|---|---|
| 5,178,445 | 1/1993 | Moddel et al. | 359/85 |
| 5,313,321 | 5/1994 | Yamamoto et al. | 349/27 |
| 5,392,140 | 2/1995 | Ezra et al. | 349/15 |

FOREIGN PATENT DOCUMENTS

| | | | |
|---|---|---|---|
| 63-124028 | 5/1988 | Japan | 349/2 |
| 4274027 | 9/1992 | Japan . | |
| 2191014 | 12/1987 | United Kingdom . | |
| 2269238 | 2/1994 | United Kingdom . | |
| 9112560 | 8/1991 | WIPO . | |

OTHER PUBLICATIONS

Jared et al, Optics Letters, Jun. 15, 1991, vol. 16, No. 12, pp. 967–969, "Optically Addressed Thresholding Very–Large–Scale–Integration/Liquid–Crystal Spatial Light Modulators".

Akiyama et al, Japanese Journal of Applied Physics, 30 Dec. 1991, No. 12B, Part 1, Tokyo, JP, "A New Optical Neuron Device for All–Optical Neural Networks".

Killinger et al, Applied Optics, 31 (1992) Jul. 10, No. 20, New York, vol. 31, "Bistability and Nonlinearity in Optically Addressed Ferroelectric Liquid–Crystal Spatial Light Modulators: Applications to Neurocomputing".

Search Report for UK. Appl. 9412347.8, mailed Aug. 23, 1994.

Yu, "Microcomputer–Based Programmable Optical Correlator for Automatic Pattern Recognition and Identification", Jun. 1986/vol. 11, No. 6/Optical Letters, pp. 395–397.

*Primary Examiner*—William L. Sikes
*Assistant Examiner*—Charles Miller

[57] ABSTRACT

A lens is arranged to form a spatially varying intensity distribution at a photoreceptor within a pixel region so as to form a charge pattern thereon. The photoreceptor is associated with a liquid crystal device such that the presence of a suitable recording voltage across the photoreceptor and liquid crystal device causes regions of the liquid crystal device to switch to an opaque state when the light intensity on an associated region of the photoreceptor exceeds a threshold value $I_{th}$. Removal of the recording voltage allows the image held in the liquid crystal device to be stored in a non-volatile manner and to be replayed by illumination with a read beam. An analog image having a grey scale can be reproduced from the pixel region. A plurality of pixel regions can be provided as an array so as to record and replay monochrome images.

21 Claims, 2 Drawing Sheets

OPTICAL DEVICE INCLUDING A SPATIAL OPTICAL MODULATOR AND AN OPTICAL ELEMENT

The present invention relates to an optical device. Such a device may be used, for instance, for storing an image or for providing amplification of an image. The present invention also relates to a display device.

WO 91/12560 discloses a spatial light modulator of improved aperture ratio in an image projection system. Collimated light is passed through an aperture mask and imaged by a first array at a spatial light modulator which modulates the light with an image to be projected. The modulated light passes through a seismic lens array onto an optically addressed spatial light modulator which stores the image. The stored image is then illuminated and projected via an optical system onto a viewing screen. The second lens array is used to form contiguous images of the apertures in the aperture mask at the optically addressed spatial light modulator. The grey scale capability of this device is thus entirely dependent on the grey scale capabilities of the two spatial light modulators.

GB 2 191 014 discloses a spatial light modulator in which an electro-optic ceramic is used as a modulating element. The ceramic is driven electrically to provide a controllable phase change. Light is directed onto and received from the ceramic by an array of microlenses.

GB 2 269 238 discloses a spatial light modulator comprising a ferroelectric liquid crystal adjacent a photoconductive layer. The modulator can thus be addressed optically and an image can be stored by applying suitable voltages across the liquid crystal and the photoconductive layer.

According to a first aspect of the invention, there is provided an optical device comprising: a spatial optical modulator having a write mode in which the modulator is reversibly optically switched between a first optical state and a second optical state where optical radiation intensity exceeds a predetermined threshold; and an optical element arranged to convert spatially uniform radiation to a local spatially varying intensity distribution at the spatial optical modulator.

It is thus possible to provide an optical device which is capable of capturing and replaying an image having a grey scale, by spatially encoding analog intensity levels.

Such a device may use bistable liquid crystals, such as ferroelectric liquid crystals, and is capable of rapid image writing and image refresh rates. Such devices may be used in optical image processors and displays.

The modulator may be a spatial light modulator and may be arranged, when in the write mode, to be switched from optically transmissive to non-transmissive states when the optical radiation intensity exceeds the predetermined threshold.

Preferably the optical element comprises at least one spherical or aspherical lens. Advantageously, the optical element is arranged to produce an array of intensity distributions. The optical element may comprise a micro-optic array. The micro-optic array may comprise a plurality of spherical or aspherical micro-lenses. The lenses of the array may be axicon like lenses formed by embossing an array of profiled refractive micro-lenses.

Alternatively the optical element may comprise at least one micro-optic mask. The mask may be formed by patterned or thickness profiled metal film such that the optically transmissive properties of the mask vary spatially.

As a further alternative, the optical element may comprise at least one diffractive and/or reflective element.

Preferably the modulator comprises a liquid crystal device, for instance comprising surface stabilised ferroelectric liquid crystal.

Preferably the modulator comprises a photodetector, such as a photoconductor. The photodetector may be a layer of amorphous silicon.

Preferably the photodetector forms part of the liquid crystal device.

According to a second aspect of the present invention, there is provided a display device comprising an optical device according to the first aspect of the present invention, and image writing means for writing an image into the optical device.

Preferably the image writing means comprises an electrically addressed spatial light modulator.

The display device may be incorporated within a projection system. Thus an image, which may be too faint to be projected, provided by the image writing means is recorded in the optical device and then replayed using a relatively intense light such that the replayed image is sufficiently bright to be projected.

The present invention will further be described, by way of example, with reference to the accompanying drawings, in which.

Figure 1:
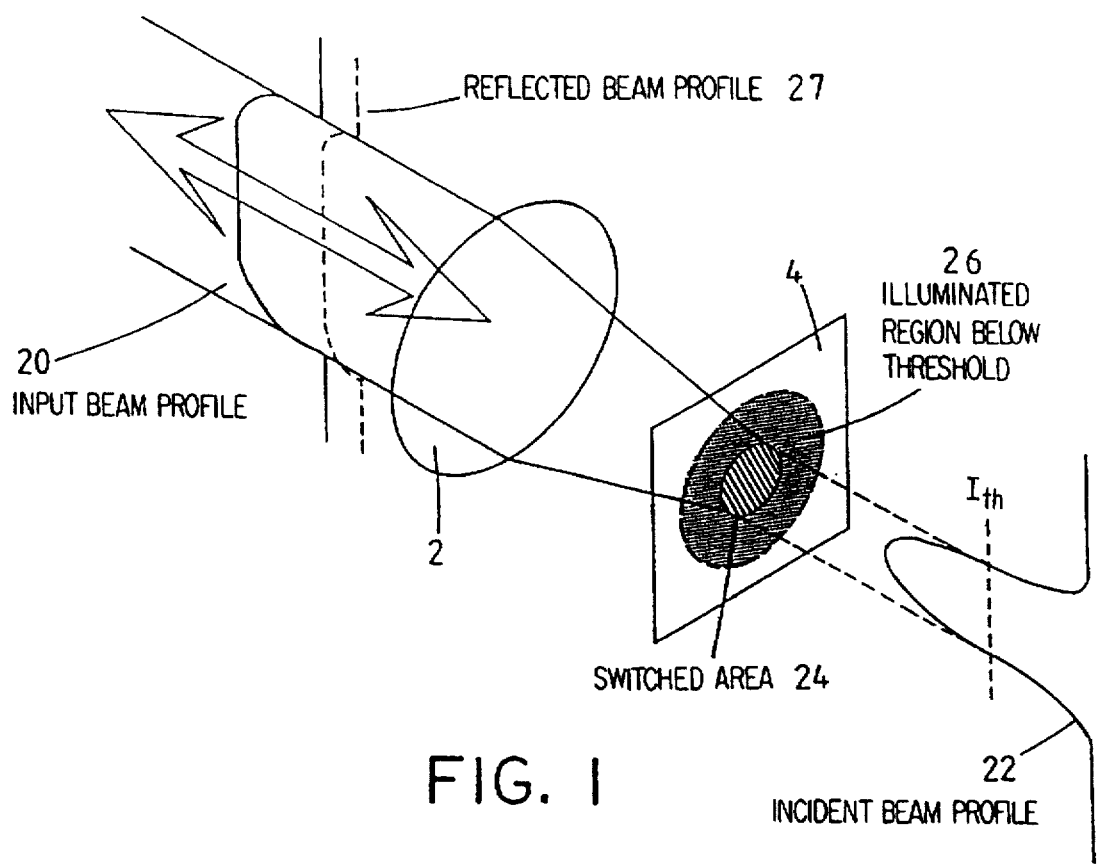
FIG. 1 is a schematic diagram showing an optical device constituting a first embodiment of the present invention.

The optical device shown in FIG. 1 comprises a lens 2 arranged to focus light into a binary optically addressed spatial light modulator (OASLM) 4. The OASLM 4 is shown in greater detail in FIG. 2 and comprises a first planar glass element 6, on a first side of which is formed a first transparent plane electrode 8, for instance of indium tin oxide. A second glass element 16 has a second electrode 14 formed on a first side thereof. A layer 12 of amorphous silicon is formed on the second electrode 14. The layer 12 faces the first electrode 8 but is separated therefrom. A liquid crystal 10 is enclosed between the amorphous silicon layer 12 and the first electrode 8. The liquid crystal is a ferroelectric liquid crystal (FLC). Polarisers (not shown) are provided for polarising the light incident on the OASLM 4.

The lens 2 forms a non-uniform intensity distribution at the OASLM 4. More specifically, when the light intensity incident at a surface of the lens 2 is substantially uniform over substantially the whole surface of the lens, the image formed at the OASLM 4 has a spatially varying intensity. The light falling on the amorphous silicon layer 12 causes a charge pattern to be generated in the layer. By applying a suitable potential difference across the electrodes 8 and 14, the FLC can be caused to switch adjacent those regions of the silicon layer where the light intensity exceeds a threshold level, $I_{th}$.

In the example shown in FIG. 1, an input light beam has a generally constant spatial intensity distribution, as indicated schematically by an input beam profile 20, which is circularly symmetric about the axis of the lens 2. The lens 2 focuses the light towards the OASLM 4 such that the spatial intensity distribution of light arriving at the OASLM is most intense along the axis of the lens and decreases with increasing distance form the axis of the lens, as indicated by the incident beam profile 22. The intensity within a central area 24 exceeds the threshold intensity, thereby causing the photoconducting layer 12 within that central area to be sufficiently conducting to inject charges into the FLC adjacent the central region to cause the FLC adjacent the central region to switch state.

The intensity of light incident on an outer region 24 is insufficient to cause the FLC in that region to be switched.

Thus the size of the switched central area 24 is a function of the light intensity at the lens 2. The light intensity is encoded by the size of the central area 24, thereby allowing the essentially binary nature of the OASLM 4 to record an analogue light intensity.

The image stored in the OASLM can be replayed by removing the potential difference between the electrodes 8 and 14 so as to prevent the OASLM 4 from switching and directing a read beam towards the OASLM via the lens 2. Light reflected from the switched portion is collected by the lens 2 which images the light so as to give a substantially uniform intensity distribution over the whole of the lens area, as indicated by the reflected beam profile 27. The intensity of the reflected light is a function of the intensity of the light that was used to write the image into the OASLM. Thus an analogue illumination intensity can be recorded and replayed.

Figure 2:
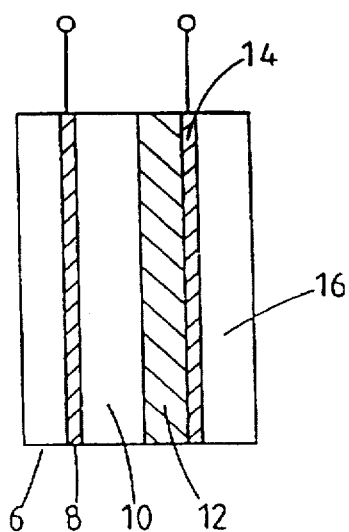
FIG. 2 is a cross section through an optically addressed spatial light modulator shown in FIG. 1.
Figure 3:
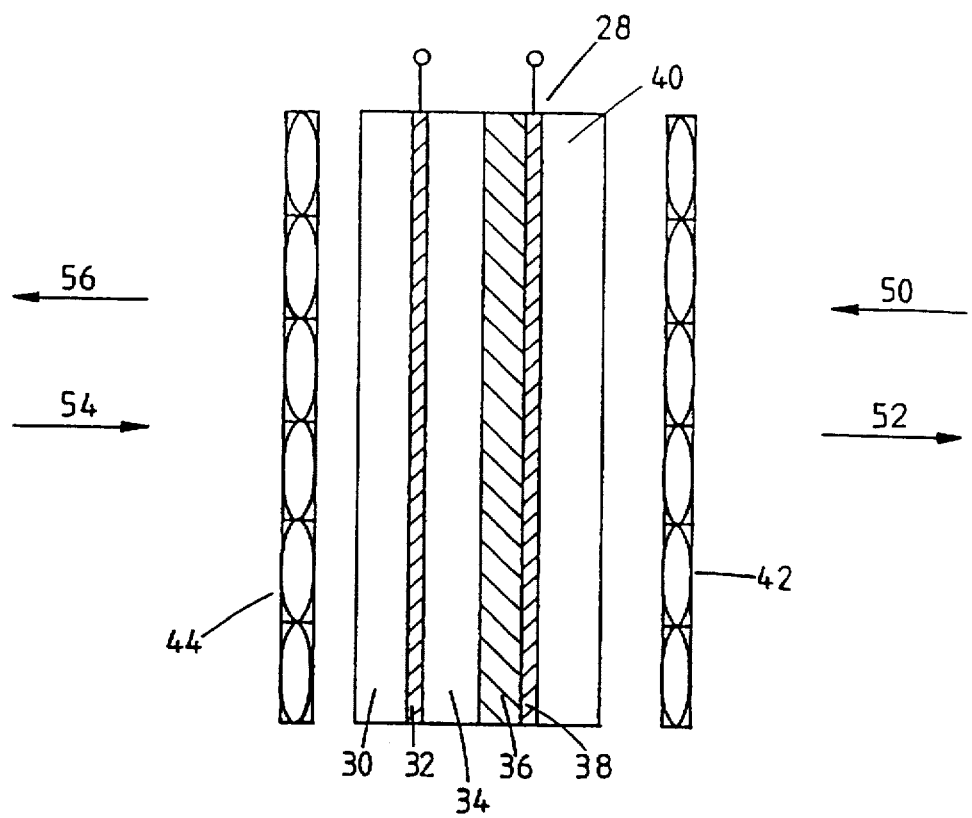
FIG. 3 is a cross section through an optical element constituting a second embodiment of the present invention.

FIG. 3 shows a portion of a multi-pixel OASLM device, indicated generally as 28, that can be used to store images. Such a device can be used within projection systems. The structure is similar to that of the device shown in FIG. 2. The OASLM 28 comprises first planar glass element 30, on a first side of which is formed a first transparent plane electrode 32. A second glass element 40 has a second transparent electrode 38 formed on a first side thereof. A layer 36 of amorphous silicon is formed on the second transparent electrode 38. The layer 36 faces the first electrode 32 but is separated therefrom. A liquid crystal 34 is enclosed between the amorphous silicon layer 36 and the first electrode 32.

A first micro-optic array 42, such as an array of microlenses, is positioned adjacent the second glass element 40 of the OASLM 28. Each element of the micro-optic array 42 defines a pixel region within the OASLM 28. Thus the size and position of each pixel region within the OASLM is defined by the micro-optic array 42. Additionally a further micro-optic array 44 is provided adjacent the first glass element 30. The further array 44 has a pitch equal to that of the first array 42 and the elements thereof are substantially aligned with respective pixel regions defined by the first array 42. External polarisers (not shown) are provided for polarising the light incident on the OASLM 4.

For a device in which the micro-optic elements are micro-lenses, each micro lens is arranged to define a pixel of sufficient size to allow a range of grey levels to be encoded. However, each lens should be relatively small so as to have many pixel regions per unit area in order to achieve sufficient resolution. Micro-lenses having a diameter of 50 µm and a focal length of 2 mm can produce a pixel or "spot" size of 20 µm at the photoconducting layer 36. Such an arrangement avoids overlapping of spots or cross-talk between adjacent pixel regions. A high resolution device having the ability to store a 1000×1000 analogue monochrome image can be provided by a device measuring approximately 5 cm×5 cm.

Using a simple micro-lens which has a spot intensity distribution which is approximately Gaussian, i.e.

$$I = I_0 e^{-\alpha^2 r^2}$$

where I is the intensity;

$I_0$ is the peak input intensity;

r is radius from the optical axis of the lens; and

α is a constant, causes a region of the OASLM within each pixel region to switch when the light intensity exceeds a threshold value $I_{th}$, thus giving rise to a switched region of radius $r_{th}$ defined by:

$$I_{th} = I_0 e^{-\alpha^2 r_{th}^2}$$

The image stored in the device is read by illuminating the OASLM with light in the direction of arrow 54. Light is reflected from each of the switched areas through the lens of the array 44, which was used to write the image into the pixel region and leaves the array in the direction of arrow 56. The OASLM may be a transmissive type. In this case the light illuminating the OASLM in the direction of arrow 54 leaves the array in the direction of arrow 52. The binary nature of the OASLM (i.e almost complete reflection from the switched area and substantially no reflection from the unswitched area), gives rise to a reflectivity R defined by:

$$R = \int_0^{r_{th}} 2\pi r e^{-\alpha^2 r^2} dr$$

which may be simplified to:

$$R = \frac{\pi}{\alpha^2} \left( 1 - \frac{I_{th}}{I_0} \right)$$

Thus, reflectivity is proportional to $1/I_0$.

The linearity of the response can be improved by reading the image from each pixel region with a uniformly intense beam, for example by omitting the further lens array 44 and illuminating the OASLM 28 with light in the direction of arrow 54. The intensity of the light reflected in the direction of arrow 56 is proportional to $\ln(I_0/I_{th})$.

Further improvements in linearity can be achieved by tailoring the micro-optic elements of array 44 specifically for reading the image from the OASLM 28.

For a substantially linear response, it is desirable to have a micro-optic array of elements which give a rotationally symmetric intensity profile in the plane of the amorphous silicon layer 36 which profile has a 1/r dependence, albeit necessarily limited to a finite value along the axis. Suitable micro-optic elements can be formed using profiled aspheric lenses, graded or spatially patterned metal masks, computer generated holograms or a hybrid of these. One technique for achieving an intensity profile which approximates the desired 1/r dependence is to use a micro-lens indirectly to produce refracting surfaces with inverse profiles to that of normal lenses. Such lenses can be formed by embossing a polymer onto regular surface relief micro-lenses to produce axicon-like lens profiles (an axicon lens is circularly symmetric and typically conic in shape).

The OASLM shown in FIG. 3 can be used to store images in a manner similar to that described for the embodiment shown in FIGS. 1 and 2. An image is recorded in the device when a suitable record voltage is applied between the conducting layers 32 and 38. The image is replayed using a bright read light with the record voltage removed, and the device can be refreshed prior to recording of a subsequent image by applying a suitable voltage to switch all of the liquid crystal layer 34 to a transmitting state.

Figure 4:
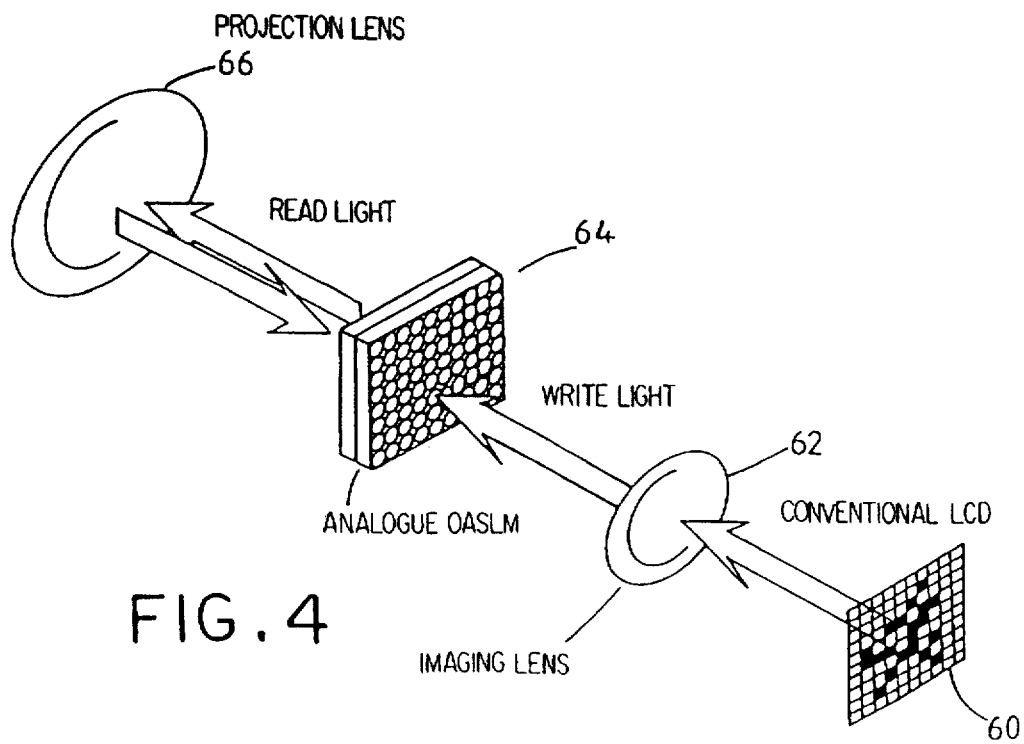
FIG. 4 is a schematic diagram of an image projection apparatus constituting a further embodiment of the present invention.

FIG. 4 schematically shows a projection display system in which a conventional liquid crystal display 60 is used to write an image into an "analog" OASLM 64 (consisting of the OASLM 28 and micro-optic arrays 42 and 44 as shown in FIG. 3) via an imaging lens 62. For the sake of clarity, polarisers required for polarising the write and read lights have been omitted from the diagram. The display 60 can be a physically small device whose tolerance to optical intensity is insufficient to allow it to be used for direct projection. A relatively intense read light can then be used to retrieve the image from the analog OASLM 64 and the image can be projected onto a screen (not shown) via a projection lens 66. Thus a grey scale high resolution image can be projected. The grey scale of the image formed in the display 60 may be modified to improve the linearity of the image reproduced from the analog OASLM 64, albeit with a consequential reduction in dynamic range.

The image in the analog OASLM 64 is stored in a non-volatile manner. Furthermore the device potentially has update rates of the order of 10000 frames per second.

Such a device is also suitable for use in optical processing systems which use incoherent to coherent conversion.

The liquid crystal layer may incorporate a pleochroic dye. The anisotropic dyes dissolved in the liquid crystal (guest-host liquid crystal layer) have polarisation dependent absorptions. Such liquid crystal devices can typically achieve an on-off contrast ratio of 10:1 to polarised light. Thus one of the external polarisers may be omitted. Additionally a polariser may be integrally formed with the device, for example, a polariser may be formed at a boundary of the liquid crystal layer.

The device can also be used as a novelty filter. A filter image may be presented to, and stored in, the device. Subsequent images can then be compared with the filter image. The output of the device, which may be formed by measuring a current flowing in the silicon layer 36, may be thresholded since a non-zero output will occur even if an image and the filter image are identical. The filter will tend to be more sensitive to intensity changes in regions corresponding to relatively dark regions of the filter image and less sensitive to changes in regions corresponding to relatively bright regions of the filter image.

It is thus possible to produce a high resolution optical device capable of storing an image having a grey scale in a non-volatile manner and of replaying the image.

What is claimed is:

1. An optical device comprising:

a spatial optical modulator and an optical element, wherein the spatial optical modulator has a write mode which the modulator is reversibly optically switched between a first optical state and a second optical state where the optical radiation intensity exceeds a predetermined threshold, and in which the optical element is arranged to convert spatially uniform radiation to a local spatially varying intensity distribution at the spatial optical modulator.

2. A device as claimed in claim 1, wherein the modulator is a spatial light modulator.

3. A device as claimed in claim 1, wherein the modulator is arranged, when in the write mode, to be switched from an optically transmissive state to an optically non-transmissive state where the optical radiation intensity exceeds the predetermined threshold.

4. A device as claimed in claim 1, wherein the optical element comprises at least one lens.

5. A device as claimed in claim 1, wherein the optical element comprises at least one micro-optic mask.

6. A device as claimed in claim 5, wherein the at least one micro-optic mask is a patterned or thickness profiled metal film such that the optically transmissive properties of the at least one micro-optic mask vary spatially.

7. A device as claimed in claim 1, wherein the optical element comprises at least one diffractive element or reflective element.

8. A device as claimed in claim 1, wherein the optical element is arranged to produce an array of spatially varying intensity distributions at tho spatial optical modulator.

9. A device as claimed in claim 1, wherein the optical element comprises a plurality of spherical or aspherical micro-lenses in a micro-optic array.

10. A device as claimed in claim 9, wherein the lenses of the array are axicon like lenses.

11. A device as claimed in claim 1, wherein the modulator comprises a liquid crystal device.

12. A device as claimed in claim 11, wherein the liquid crystal device comprises surface stabilised ferroelectric liquid crystal.

13. A device as claimed in claim 1, wherein the modulator comprises a photodetector for controlling switching between the first and second optical states in response to optical radiation intensity distribution.

14. A device as claimed in claim 13, wherein the photodetector is a photoconductor.

15. A device as claimed in claim 14, wherein the photoconductor is a layer of amorphous silicon.

16. A device as claimed in claim 13, wherein the photodetector forms part of a liquid crystal device, and the modulator comprises the liquid crystal device.

17. A device as claimed in claim 13, wherein the optical element is arranged to form an image on the photodetector.

18. A device as claimed in claim 17, further comprising image reading means for directing optical radiation at the modulator and for imaging optical radiation reflected therefrom.

19. A display device comprising the optical device of claim 1, and further comprising image writing means for writing an image into the optical device.

20. A device as claimed in claim 19, wherein the image writing means comprises an electrically addressed spatial light modulator.

21. A device as claimed in claim 19, further comprising projection means for projecting an image replayed from the optical device.

* * * * *